(12) United States Patent
Fukuda et al.

(10) Patent No.: US 6,580,952 B2
(45) Date of Patent: Jun. 17, 2003

(54) SYSTEM FOR CONTROLLING POWER PLANTS AND METHOD FOR ARRANGING THE SYSTEM

(75) Inventors: Hiroshi Fukuda, Tokyo (JP);
Toshihiko Tanaka, Kanagawa-ken (JP);
Masao Isshiki, Kanagawa-ken (JP);
Yuuichi Shibata, Saitama-ken (JP);
Kanetoshi Nara, Saitama-ken (JP);
Naomi Hattori, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 246 days.

(21) Appl. No.: 09/827,331

(22) Filed: Apr. 6, 2001

(65) Prior Publication Data

US 2002/0077728 A1 Jun. 20, 2002

(30) Foreign Application Priority Data

Apr. 7, 2000 (JP) ........................................ 2000-106475

(51) Int. Cl.⁷ .......................... G05B 15/00; G06F 11/00; G09G 5/00
(52) U.S. Cl. .......................... 700/83; 700/286; 702/188; 345/1.1; 345/108
(58) Field of Search .................. 700/83, 286; 348/143; 702/183, 188; 345/1.1–1.3, 2.1, 108, 110

(56) References Cited

U.S. PATENT DOCUMENTS

| | | | | |
|---|---|---|---|---|
| 4,957,690 A | * | 9/1990 | Fennern | 376/216 |
| 5,247,433 A | * | 9/1993 | Kitaura et al. | 700/83 |
| 5,331,413 A | * | 7/1994 | Diner | 348/159 |
| 5,537,127 A | * | 7/1996 | Jingu | 345/1.3 |
| 5,777,896 A | * | 7/1998 | Arita et al. | 702/185 |
| 6,169,927 B1 | * | 1/2001 | Schonthal et al. | 700/1 |
| 6,311,141 B1 | * | 10/2001 | Hazra | 702/150 |

FOREIGN PATENT DOCUMENTS

JP 11-296206 10/1999

* cited by examiner

*Primary Examiner*—Leo Picard
*Assistant Examiner*—Elliot L Frank
(74) *Attorney, Agent, or Firm*—Foley & Lardner (57) ABSTRACT

A system for controlling a plurality of power generation plants. The system comprises at least three display-input means for displaying process data of the power plants and for inputting signals for operating the power plants based on the displayed process data, and the display-input means are disposed in a central control room. The system also comprises allocation means for allocating at least one of the display-input means to each one of the power generation plants, based on operation phases of the power generation plants. The system also comprises moving means for moving at least one of the display-input means so that a plurality of groups of the display-input means are formed, and the display-input means of a same group be arranged closer to each other than the display-input means of different groups.

9 Claims, 8 Drawing Sheets

SYSTEM FOR CONTROLLING POWER PLANTS AND METHOD FOR ARRANGING THE SYSTEM

BACKGROUND OF THE INVENTION

This invention is related to a system for operating a plurality of electric power generation plants and a method for arranging the system in a central control room.

In the prior art, process data of a plurality of power generation plants indicating current state of the plants are sent to a central controller in a central control room, where operators monitor such process data and control those plants based on the process data. The process data may include steam or water temperatures, pressures and power generation rate of each generation plants.

Patent Abstract of Japan Publication Number 11296206 (Tokkai-hei-11-296206), discloses a central controller for monitoring and controlling a plurality of generation plants. In the disclosed system, the operators at the central controller monitor and operate the plurality of generation units in the central control room.

The central controller may have a plurality of monitor-controllers allocated to the plurality of power plants. Thus, the operators in the central control room may have to monitor and operate a plurality of monitor-controllers at the same time. Besides, the relation between the monitor-controllers and the power plants may be changed depending on the operation phases of the power plants. For example, a power plant in start-up phase may require three monitor-controllers because many process data must be monitored and controlled, while a power plant in normal operation phase may require only one monitor-controller because less process data may be enough for that operation phase. Therefore, the operators may confuse a monitor-controller corresponding to a power plant with another monitor-controller corresponding to another power plant.

SUMMARY OF THE INVENTION

Accordingly, it is an object of the present invention to provide an improved system for controlling a plurality of power generation plants preventing the confusion of the monitor-controllers corresponding to a plurality of the power plants.

It is a further object of the present invention to provide an improved method for arranging, in a central control room, a system for controlling a plurality of power generation plants preventing the confusion of the monitor-controllers corresponding to a plurality of the power plants.

There has been provided, in accordance with an aspect of the present invention, a system for controlling a plurality of power generation plants. The system comprises at least three display-input means for displaying process data of the power plants and for inputting signals for operating the power plants based on the displayed process data, and the display-input means are disposed in a central control room. The system also comprises allocation means for allocating at least one of the display-input means to each one of the power generation plants, based on operation phases of the power generation plants. The system also comprises moving means for moving at least one of the display-input means so that a plurality of groups of the display-input means are formed, and the display-input means of a same group are arranged closer to each other than the display-input means of different groups.

There has also been provided, in accordance with another aspect of the present invention, a method for arranging, in a central control room, a system for controlling a plurality of power generation plants. The method comprises a step of allocating at least one display-input means to each one of the power generation plants, based on operation conditions of the power generation plants. The method also comprises a step of moving at least one display-input means so that a plurality of groups of display-input means are formed in a central control room, and the display-input means of a same group be arranged closer to each other than the display-input means of different groups. The method also comprises, subsequent to the moving step, a step of fixing the at least one display-input means.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which:

FIGS. 5A–D are perspective views of an example of a carrier table shown in FIGS. 1–4, wherein

FIGS. 6A and B are views of one of the alternative carrier table shown in FIGS. 1–4, wherein

FIGS. 7A and B are views of an example of mechanism for moving a large screen device shown in FIG. 3, wherein FIGS. 8A and B are views of another example of a mechanism for moving a large screen device shown in FIG. 3, wherein

DETAILED DESCRIPTION OF PREFERRED EMBODIMENTS OF THE INVENTION

In the following description, like reference characters represent like elements, and repetitive description may be omitted.

A first embodiment of the invention is now described with reference to FIG. 1. A central controller 3 is placed in a central control room 2. The central controller 3 is connected to a plurality of (four in FIG. 1) plant controllers 7A–D for controlling respective power generation plants 1A–D via an allocator-controller 8. The central controller 3 has a plurality of (six in FIG. 1) monitor-controllers 5a–f fixed on respective carrier tables 10a–f.

Each of the monitor-controllers 5a–f has a display device (not shown) such as a cathode ray tube or a liquid crystal display device for displaying the data and images to be used in the operation of the power generation plants. The displayed data and images may include system diagrams, alarm messages, images for operation and process data. Each of the monitor-controllers 5a–f also has input means (not shown) including a pointing device such as a touch screen and a mouse, and a keyboard. The operators monitor and control the power generation plants 1A–D including auxiliary systems by monitoring and inputting data through the monitor-controllers 5a–f.

The carrier tables 10a–f can be slid along a rail 19 to form a plurality of groups of monitor-controllers as discussed later in detail.

The allocator-controller 8 allocates one or more appropriate monitor-controllers out of the monitor-controllers 5a–f for each of the power generation plants 1A–D based on the operation conditions of the plants 1A–D. In a condition shown in FIGS. 1 and 2A, a first monitor-controller 5a is allocated to a first power generation plant 1A. Likewise, fifth and sixth monitor-controllers 5e and 5f, respectively, are allocated to third and fourth generation plants 1C and 1D, respectively. Second, third and fourth monitor-controllers 5b, 5c and 5d are all allocated to a single second power generation plant 1B. The monitor-controllers may be allocated by the operator's input rather than automatically by the allocator-controller 8.

Figure 1:
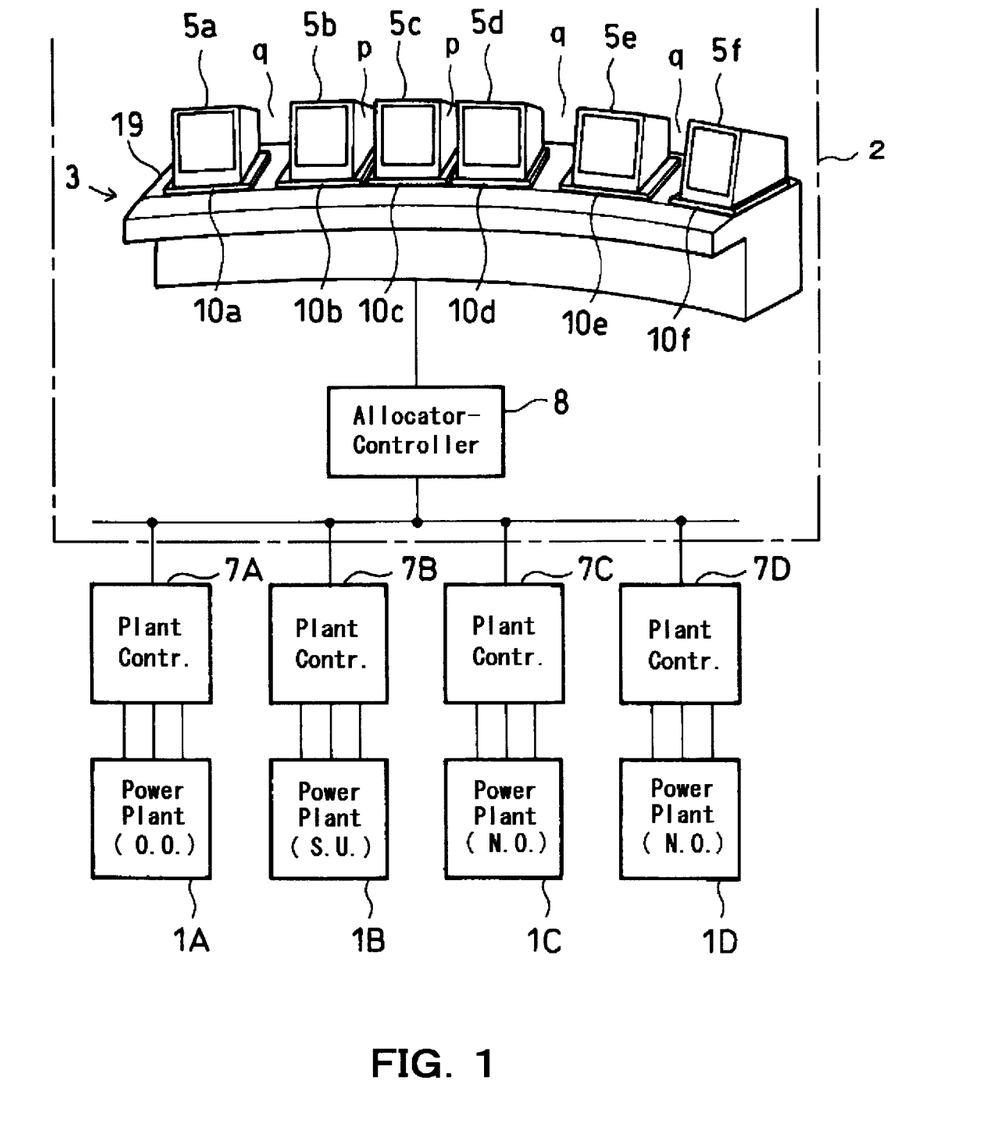
FIG. 1 is a block diagram of a first embodiment of a system according to the present invention.
Figure 2A:
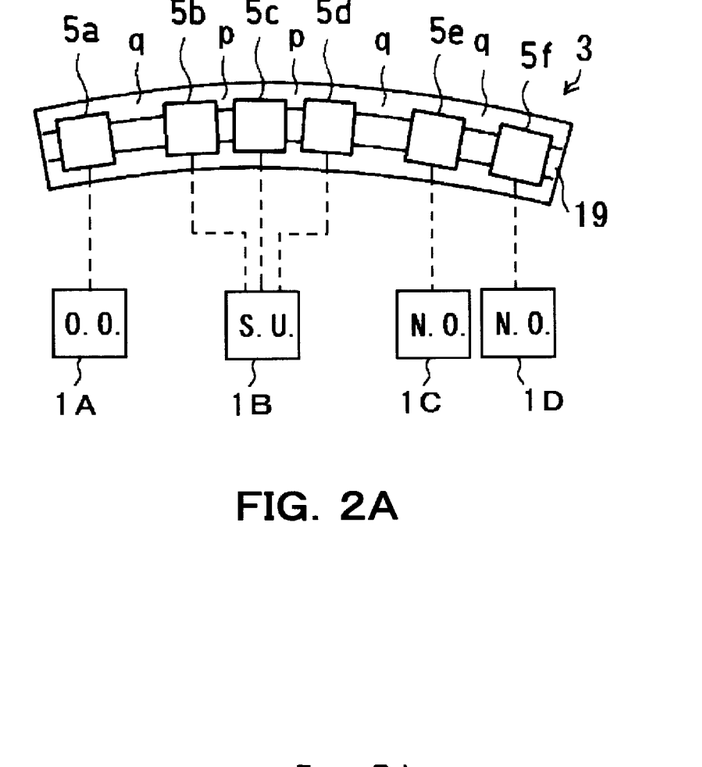
FIG. 2A is a schematic plan view of the system shown in FIG. 1.

As shown in FIGS. 1 and 2A, the monitor-controllers allocated to a same generation plant form a group, and the gaps p between the adjacent monitor-controllers within the same groups are smaller than the gaps q between the adjacent monitor-controllers of different groups. In a condition shown in FIGS. 1 and 2A, the second, third and fourth monitor-controllers 5b, 5c and 5e form a group, while each of the other monitor-controllers 5a, 5e and 5f forms its own group by itself.

The number of monitor-controllers allocated to each power generation plant depends on the required number of the process data to be monitored and controlled by the central controller 3. In the condition shown in FIGS. 1 and 2A, the first generation plant 1A may be out-of-operation (O. O.) phase, the second plant 1B in start-up (S. U.) phase, the third and fourth plants 1C and 1D, respectively, in normal operation (N. O.) phase. When a power plant is in start-up phase, many process data and operations must be monitored and inputted frequently at the central controller 3. A start-up operation of a power generation plant may include start-ups of auxiliary systems, opening/closing of electric driven valves for forming fluid circulation systems, and setting and adjustments of controllers of boilers, turbines and generators.

Figure 2B:
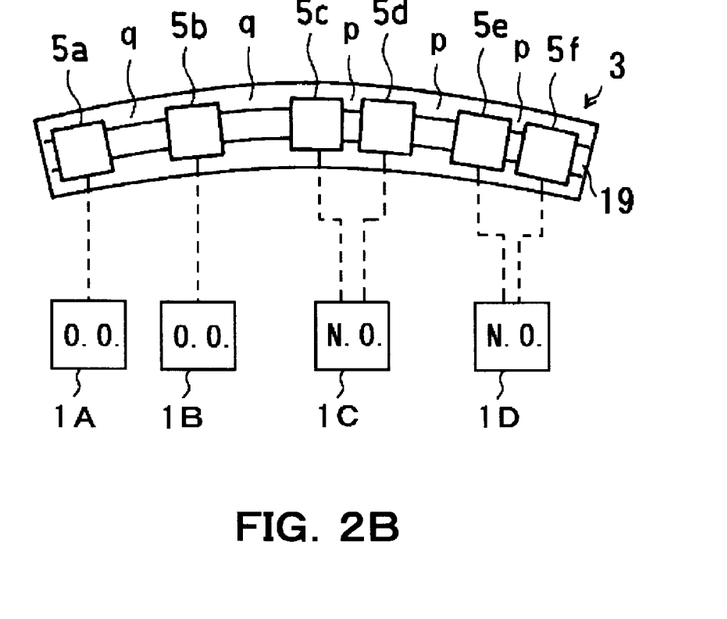
FIG. 2B is a schematic plan view of an alternative arrangement of the system.

In a condition shown in FIG. 2B, each of the first and second monitor-controllers 5a and 5b forms its own group by itself, while the third and fourth monitor-controllers 5c and 5d form a group together, and the fifth and sixth monitor-controllers 5e and 5f form a group. The first and second monitor-controllers 5a and 5b are allocated to the first and the second power plants 1A and 1B, respectively. The third and the fourth monitor-controllers 5c and 5d are allocated to the third plant 1C, and the fifth and the sixth monitor-controllers 5e and 5f are allocated to the fourth plant 1D.

The first and second generation plants 1A and 1B are in out-of-operation phase, while the third and fourth generation plants 1C and 1D are in normal operation phase.

The plants 1A and 1B are allocated less monitor-controllers per plant than the plants 1C and 1D, because the plants in out-of-operation phase require less monitorings and operations or inputs compared with the plants in normal operation phase. In the plants in out-of-operation phase, turning operation of the steam turbines and "run-back operation" in the plant are performed, and most of the auxiliary system operations are not required and the numbers of required monitoring or operating items are small.

When operation conditions of some of the power plants 1A–D monitored and controlled by the central controller 3 change, the allocation of the monitor-controllers 5a–f may be changed by the allocator-controller 8. At that time, some of the monitor-controllers are moved along the rail 19 by the operators, so that the grouping of the monitor-controllers is changed.

Since each of the groups of the monitor-controllers 5a–f corresponds to only one of the power plants 1A–D, the operators easily recognize the relation between each of the monitor-controllers 5a–f and the power plants 1A–D, and confusion of the monitor-controllers by the operators can be prevented.

Alternatively, the monitor-controllers 5a–f my be moved automatically by electric motors (not shown) rather than moved by hands of the operators.

When a monitor-controller is moved from one group to another, the data stored in the monitor-controller are transferred to an adjacent succeeding monitor-controller. This transition of data may be performed automatically by the allocation-controller 8, so that the monitoring and the controlling of the plant may be continuous.

Figure 3:
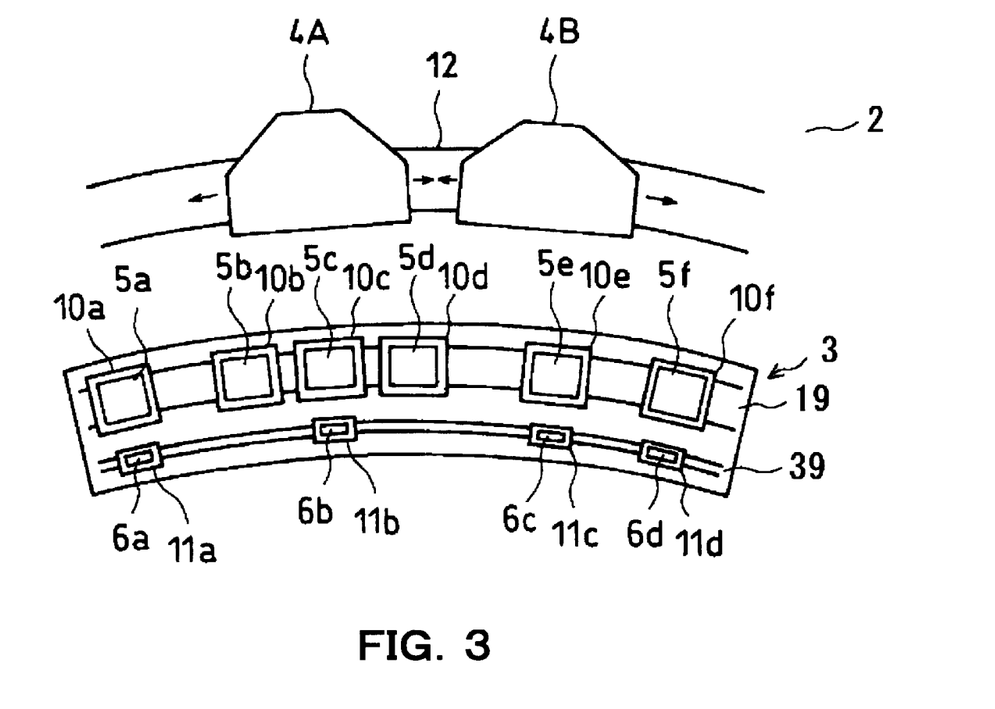
FIG. 3 is a schematic plan view of a second embodiment of a system according to the present invention.

FIG. 3 shows a second embodiment of a system according to the present invention. In this system, two large screens 4A and 4B are disposed in the central control room 2 as well as a central controller 3. The central controller 3 has four operation-input devices 6a–d as well as six monitor-controllers 5a–f described above.

The large screens 4A and 4B have a moving mechanism 12 so that the large screens 4A and 4B can be moved parallel to the rail 19 of the central controller 3. The operation-input devices 6a–d can be moved with their carrier tables 11a–d along their own rail 39 which is parallel to the rail 19. The operation-input devices 6a–d may include keyboards and hardware switches.

The arrangement of the monitor-controllers 5a–f shown in FIG. 3 is the same as that shown in FIGS. 1 and 2A. The large screen 4A is disposed close to the monitor-controllers 5b, 5c and 5d to display information about the second power generation plant 1B. Likewise, the screen 4B is disposed close to the monitor-controllers 5e to display information about the third power generation plant 1C.

Each of the operation-input devices 6a–d corresponds to its respective one of the power generation plants 1A–D, so that each of the operation-input devices 6a–d is placed close to its corresponding group of the monitor-controllers as shown in FIG. 3.

The screens 4A and 4B and the operation-input devices 6a–d are allocated to the power generation plants 1A–D by the allocation-controller 8 (shown in FIG. 1) automatically or by the operator's input in a similar way as the monitor-controllers 5b–f described above.

The screens 4A and 4B may be disposed adjacent to each other and be used as a single large integrated screen for general monitoring in normal condition. When one of the power generation plants requires detail monitoring, in a start-up phase, for example, the screens 4A and 4B may be separated, and one of them may be moved close to the group of the related monitor-controllers for displaying data relating to the particular power generation plant.

Figure 4:
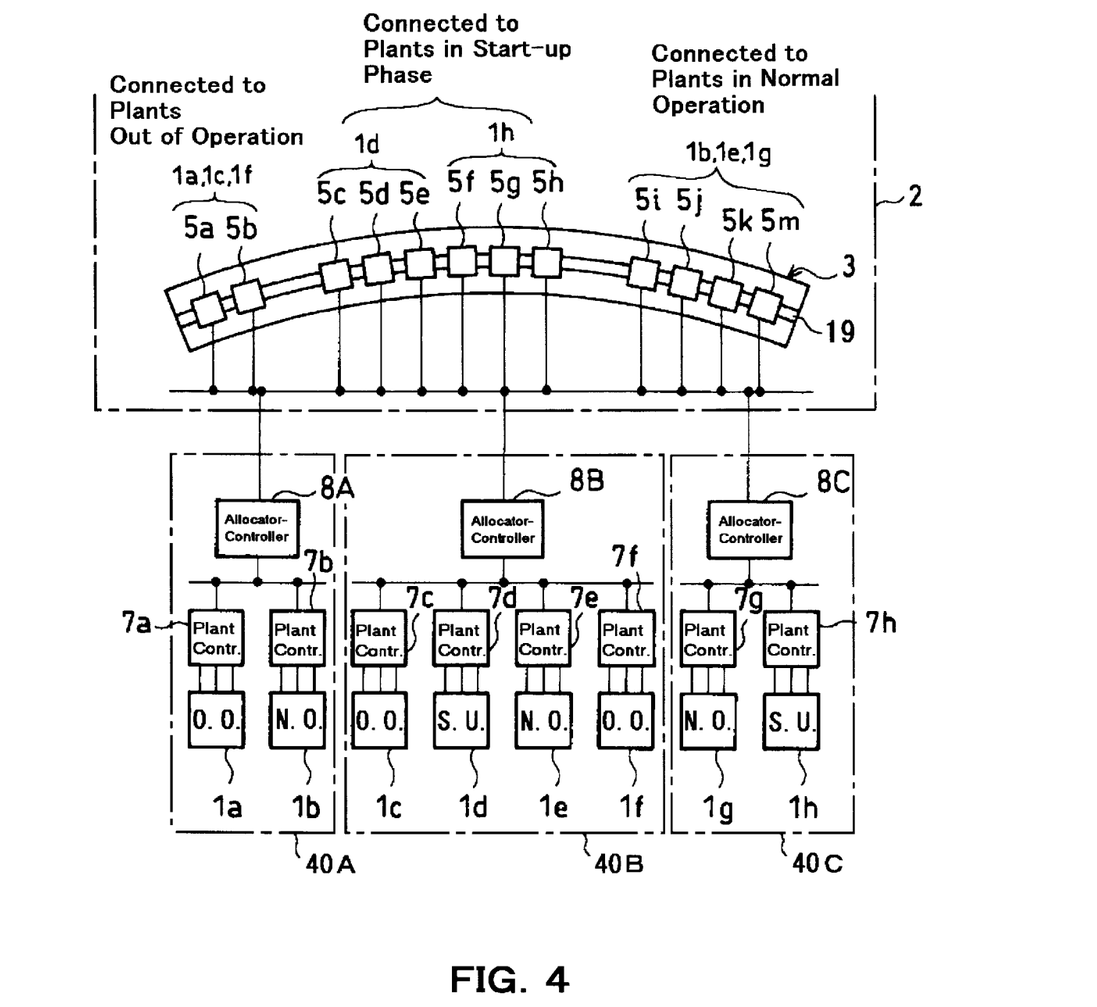
FIG. 4 is a schematic plan view of a third embodiment of a system according to the present invention.

FIG. 4 shows a third embodiment of a system according to the present invention. Referring to FIG. 4, a first power generation station 40A includes two power generation plants 1a and 1b, their respective plant controllers 7a and 7b, and a station allocator-controller 8A connected to the plant controllers 7a and 7b. Likewise, a second power generation station 40B includes four power generation plants 1c–f, their respective plant controllers 7c–f and a station allocator-controller 8B connected to the plant controllers 7c–f, and a third power generation station 40C includes two power generation plants 1g and 1h, their respective plant controllers 7g and 7h and a station allocator-controller 8C connected to the plant controllers 7g and 7h.

The central control room 2 has a central controller 3, which has twelve monitor-controllers 5a–m movable along the rail 19. The station allocator-controllers 8A–C are connected to all of the monitor-controllers 5a–m.

The station allocator-controllers 8A, 8B and 8C allocate one or more of the monitor-controllers 5a–m to each one of their power generation plants 1a–h. The number of monitor-controllers allocated to each one of the power generation plants may depend on the operation phase of the plant, as in case of the embodiments described above.

FIG. 4 shows a condition when the power generation plants 1a, 1c and 1f are in out-of-operation phase, the plants 1d and 1h are in start-up phase, and the plants 1b, 1e and 1g are in normal operation phase. In this case, the two monitor-controllers 5a and 5b are collectively allocated to the three plants 1a, 1c and 1f in out-of-operation phase. On the other hand, the three monitor-controllers 5c–e and the three monitor-controllers 5f–h are allocated to the plant 1d and 1h in start-up phase, respectively. The four monitor-controllers 5i–m are collectively allocated to the three plants 1b, 1e and 1g in normal operation phase.

In this embodiment, each one of the monitor-controllers, such as the monitor-controllers 5a, 5b, 5i–m, may not correspond to a single plant, and a group of relatively small number of monitor-controllers may cover larger number of plants.

As shown in FIG. 4, the monitor-controllers are moved so that the monitor-controllers in the same group corresponding to the same operation phase of the allocated plants are located close to each other. Thus, relatively small number of monitor-controllers and relatively small number of operators in the central control room 2 can cover the whole plants effectively and reliably.

Figure 5A:
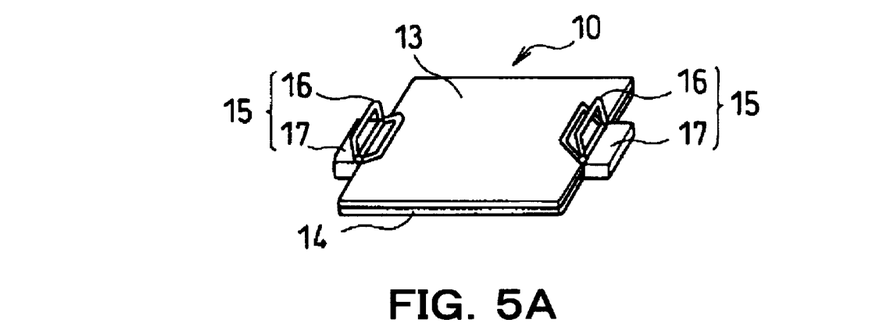
FIG. 5A shows the whole carrier table.

FIGS. 5A–D show an example of a carrier table 10 used as one of the carrier tables 10a–f or 11a–d. As shown in FIG. 5A, the carrier table 10 comprises a rigid plate 13 shaped in a rectangular (or in a circle), a sliding liner 14 placed on the bottom of the rigid plate 13 and two fixing elements 15 on opposite sides of the rigid plate 13.

The rigid plate 13 has a flat top surface for a monitor-controller to be fixed on it. The sliding liner 14 is attached to the bottom of the rigid plate 13 by screws or adhesively, for example. The bottom surface of the sliding liner 14 is formed slippery on the rail 19.

Figure 5B:
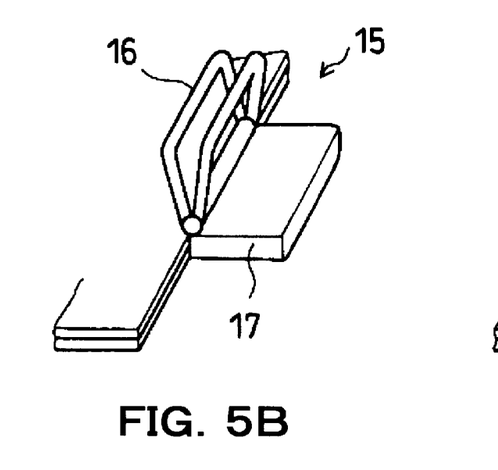
FIG. 5B shows an enlarged view of the fixing mechanism shown in FIG. 5A when the carrier table is in a released condition.
Figure 5C:
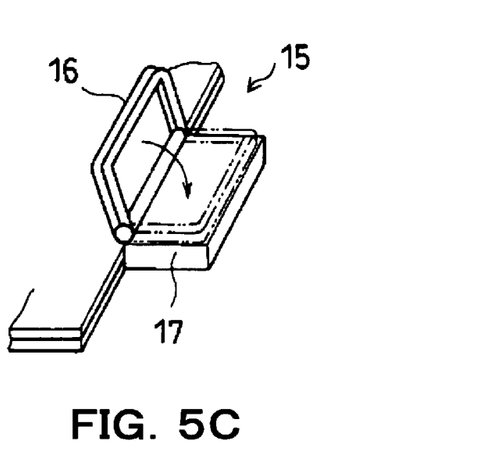
FIG. 5C shows an enlarged view of the fixing element shown in FIG. 5A when the carrier table is fixed.

The fixing element 15 comprises foldable handles 16 and a sucker 17. When the handles 16 are in an up-right position shown in FIG. 5B, the sucker 17 is released or unlocked. When the handles 16 are folded on the top surface of the sucker 17 as shown in FIG. 5C, the sucker 17 is activated and it sucks to and locks to the rail 19 (FIG. 5D).

Figure 5D:
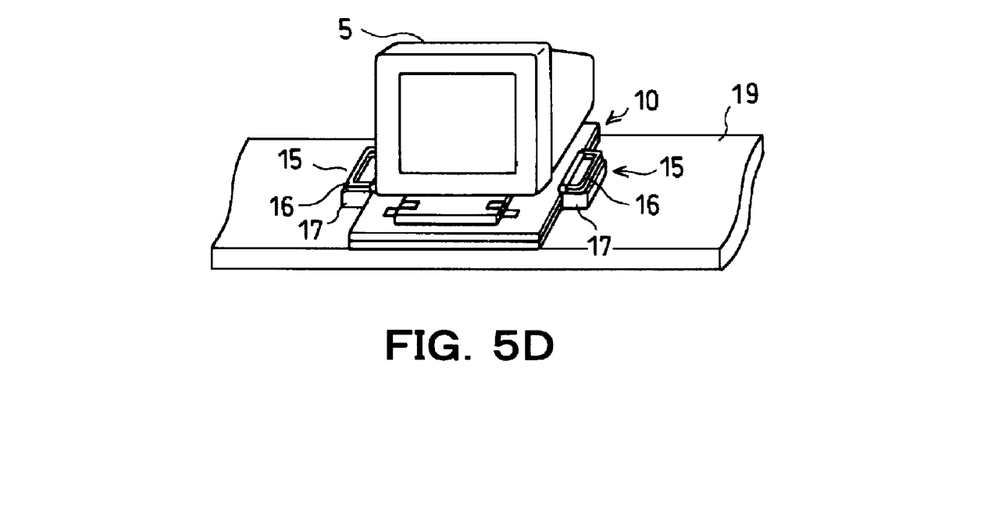
FIG. 5D shows the carrier table with the monitor-controller thereon.

FIG. 5D shows a monitor-controller 5 placed and fixed on the carrier table 10. The handles 16 are in a folded or lock position in FIG. 5D. When the monitor-controller 5 is to be moved along the rail 19, the handles 16 are held up as shown in FIG. 5B and the suckers 17 are released. Then, the carrier table 10 is slid along the rail 19 by the operator's hands. When the carrier table 10 is positioned properly, the handles are folded down in the locked position shown in FIG. 5D again and the carrier table 10 is locked there.

Since the bottom surface of the sliding liner 14 is slippery on the rail 19, the monitor-controller 5 can be moved easily by hands of the operators. Thus, it is easy to rearrange the monitor-controllers in response to changes of allocations of the monitor-controllers corresponding to changes of operation phases of the power plants.

Alternatively, the rail 19 may be omitted and the carrier table 10 may be slid on a flat surface of an elongated table (not shown) transversely.

Figure 6A:
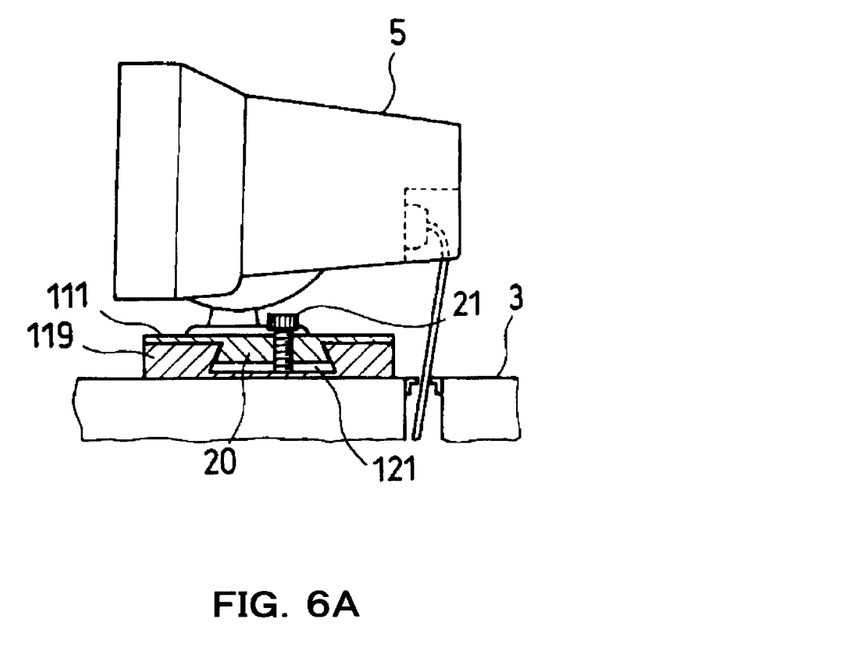
FIG. 6A is a partly sectional side view.
Figure 6B:
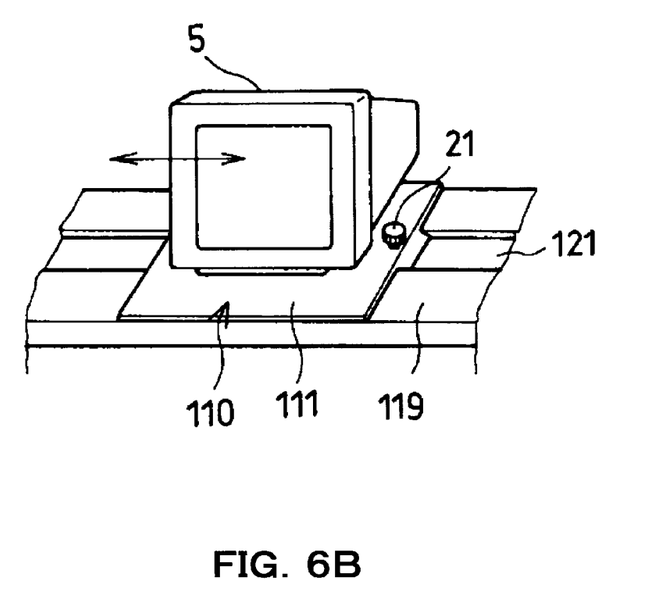
FIG. 6B is a perspective view.

FIGS. 6A and 6B show another example of a carrier table 110 used as one of the carrier tables 10a–f or 11a–d. As shown in FIGS. 6A and 6B, the carrier table 110 has a rectangular plate portion 111, on which the monitor-controller 5 is placed and fixed, and a projection 20 which is elongated transversely and projects downward from the bottom of the plate portion 111. The carrier table 110 is place on a rail 119 which is fixed on the central controller 3 as the rail 19 (FIG. 1).

The rail 119 has an elongated groove 121 on the top surface along the rail axis to receive the projection 20. The projection 20 has a trapezoidal crosssection with a bottom side longer than the upper side as shown in FIG. 6A. The groove 121 has a crosssectional shape corresponding to the projection 20 so that the projection 20 and the groove 121 engage together allowing smooth horizontal movement of the carrier table 110 along the rail 119.

The carrier table 110 has a top flat surface on which the monitor-controller 5 is placed and fixed. The carrier table 110 also has a bolt 21 which can be screwed through a hole penetrating the plate portion 111 to the rail 119. The bolt 21 can be screwed down by a bare hand for fixing the carrier table 110 to the rail 119. When the monitor-controller 5 is to be moved, the bolt 21 is screwed up by a bare hand, and the carrier table 110 is unlocked and can be moved along the rail 119 again.

As an alternative example (not shown), the rail may have an elongated projection and the carrier table may have an elongated groove for receiving the projection of the rail.

As another alternative example, the projection 20 shown in FIG. 6A may have a circular shape in a bottom view (not shown) so that the carrier table 110 may be turned about a vertical axis with sustained engagement of the projection 20 and the groove 121. In such an example, the orientation of the monitor-controller 5 can be adjusted for the operator's convenience.

Figure 7A:
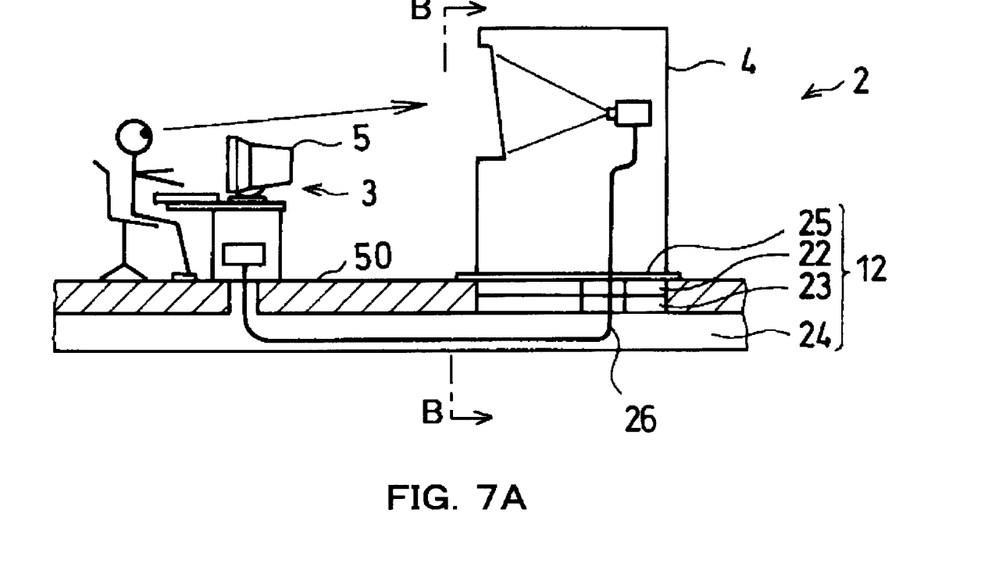
FIG. 7A is an vertical cross-sectional view.
Figure 7B:
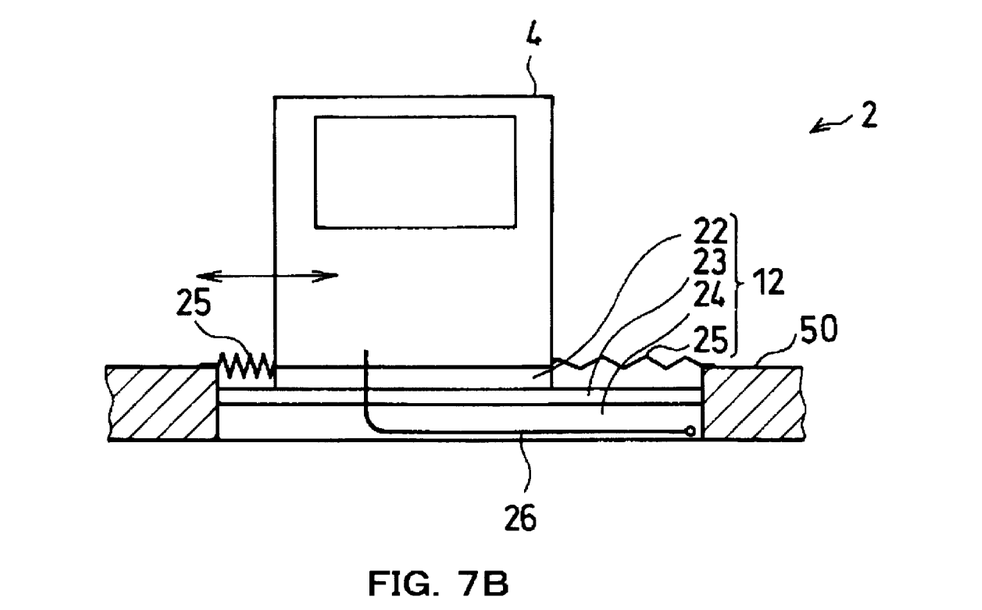
FIG. 7B is a view taken along line B—B shown in FIG. 7A.

FIGS. 7A and 7B show an example of a mechanism for moving a large screen device 4 or 4A or 4B shown in FIG. 3. A moving mechanism 12 is installed in the lower portion of the large screen device 4 and under the floor 50 of the central control room 2. The moving mechanism 12 comprises a drive mechanism 22 installed in the lower portion of the large screen device 4, a holding mechanism 23 installed below the drive mechanism 22, a cable space 24 below the holding mechanism 23 for receiving signal cables 26 for the large screen device 4, and bellows 25 for covering the openings of the floor 50 on both sides of the large screen device 4.

The drive mechanism 22 may have a carrying mechanism with a rotating shaft and may have a sliding mechanism driven hydraulically or by electric motors (not shown). The holding mechanism 23 is in touch with the drive mechanism 22 and holds the large screen device 4. The cables 26 have sufficient lengths for allowing the horizontal movement of the large screen device 4.

The bellows 25 are installed at the same level as the floor 50. One edge of each of the bellows 25 is fixed to either side of the large screen device 4 and the other edge is fixed to an edge of the opening in the floor 50. The bellows 25 expand and shrink in accordance with the movement of the large screen device 4, covering the openings in the floor 50.

When the large screen device 4 is moved to the left as shown in FIG. 7B, the bellows 25 at the left is shrunk while the bellows 25 at the right is expanded, and the signal cables 26 with sufficient lengths follow the large screen device 4. Thus, the large screen device 4 can be moved easily.

Figure 8A:
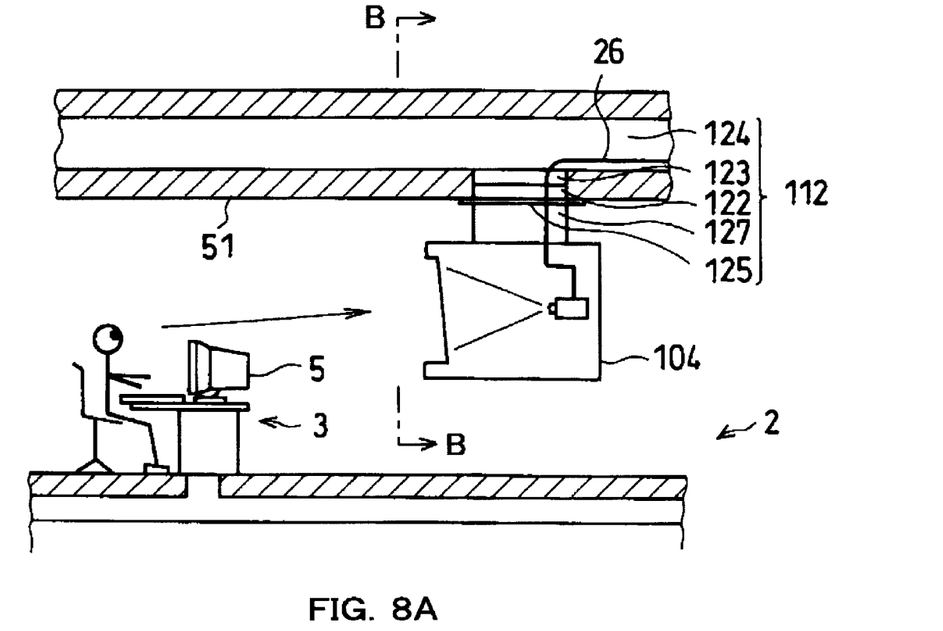
FIG. 8A is an vertical cross-sectional view.
Figure 8B:
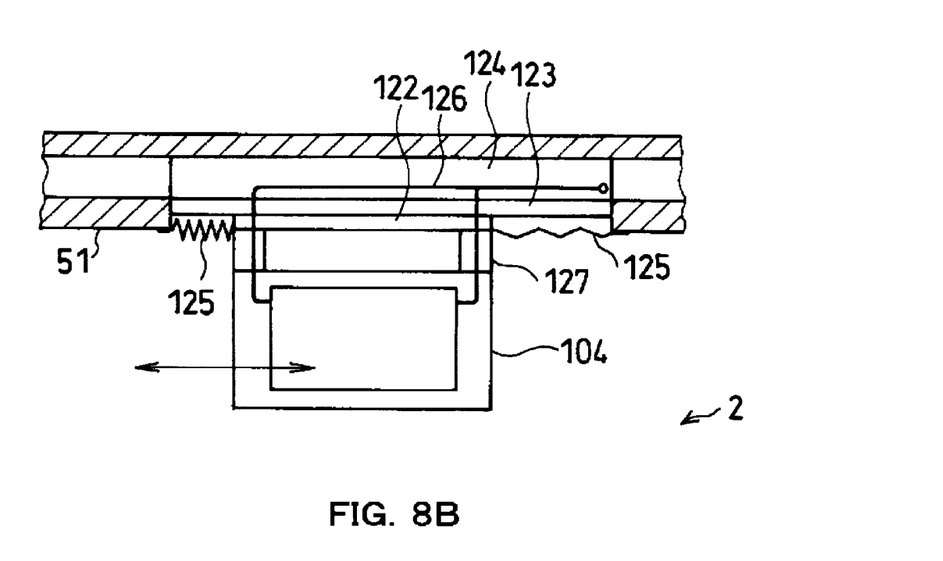
FIG. 8B is a view taken along line B—B shown in FIG. 8A.

FIGS. 8A and 8B show another example of a mechanism for moving a large screen device 104 or 4A or 4B shown in FIG. 3. In this embodiment, a large screen device 104 is hung up from the ceiling 51 of the central control room 2, and is moved by a moving mechanism 112. The moving mechanism 112 may have a hanger 127 for hanging a large screen device 104, a drive mechanism 122 for supporting the hanger 127 from the ceiling 51 and for driving the hanger 127 horizontally. The moving mechanism 112 may also have a holding mechanism 123 in contact with the moving mechanism 112, for holding the large screen device 104. The moving mechanism 112 may also have a cable space 124 for receiving signal cables 126 for the large screen device 104, and bellows 125 installed in the same surface of the ceiling 51.

The hanger 127 formed in pipes or hollow elongated bodies may be attached to the upper portion of the large screen device 104 by welding or with bolts and nuts (not shown). The drive mechanism 122 supports and drives upper part of the hanger 127. The drive mechanism 122 may be a crane and may have a sliding mechanism driven hydraulically or by electric motors (not shown).

The cables 126 in the cable space 124 has sufficient lengths for allowing the large screen device 104 to move horizontally.

The bellows 125 are installed at the same level as the ceiling 51 of the central control room 2. When the large screen device 104 is moved to the left as shown in FIG. 8B, the bellows 125 at the left is shrunk while the bellows 125 at the right is expanded, and the signal cables 126 with sufficient lengths follow the large screen device 104. Thus, the large screen device 104 can be moved easily.

Numerous modifications and variations of the present invention are possible in light of the above teachings. It is therefore to be understood that, within the scope of the appended claims, the present invention can be practiced in a manner other than as specifically described herein.

What is claimed is:

1. A system for controlling a plurality of power generation plants, the system comprising:

at least three display-input means for displaying process data of the power plants and for inputting signals for operating the power plants based on the displayed process data, the display-input means being disposed in a central control room;

allocation means for allocating at least one of the display-input means to each one of the power generation plants, based on operation phases of the power generation plants; and moving means for moving at least one of the display-input means so that a plurality of groups of the display-input means are formed, the display-input means of a same group being arranged closer to each other than the display-input means of different groups.

2. A system according to claim 1, wherein each of the display-input means is allocated by only one of the power generation plants, and the groups are formed so that the display-input means of each of the groups are allocated by same one of power generation plants.

3. A system according to claim 1, wherein the groups are formed so that the display-input means of each of the groups are allocated by the power generation plants in a same operation phase.

4. A system according to claim 3, wherein the operation phases include start-up, normal operation and out-of-operation phases.

5. A system according to claim 1, wherein the moving means includes:

at least one table for carrying the at least one of the display-input means;

a rail along which the at least one table is movable; and means for fixing the at least one table relative to the rail.

6. A system according to claim 5, wherein the table includes:

a rigid plate for carrying the at least one of the display-input means; and a sliding liner attached on bottom of the rigid plate, the sliding liner for sliding on the rail when the at least one table moves, friction factor between the liner and the rail being small.

7. A method for arranging, in a central control room, a system for controlling a plurality of power generation plants, the method comprising steps of:

allocating at least one display-input means to each one of the power generation plants, based on operation conditions of the power generation plants;

moving at least one display-input means so that a plurality of groups of display-input means are formed in a central control room, the display-input means of a same group being arranged closer to each other than the display-input means of different groups; and subsequent to the moving step, fixing the at least one display-input means.

8. A method according to claim 7, wherein each of the display-input means is allocated by only one of the power generation plants, and the groups are formed so that the display-input means of each of the groups are allocated by same one of power generation plants.

9. A method according to claim 7, wherein the groups are formed so that the display-input means of each of the groups are allocated by the power generation plants in a same operation phase.

* * * * *